(12) United States Patent
McGovern

(10) Patent No.: US 11,786,865 B2
(45) Date of Patent: Oct. 17, 2023

(54) MEMBRANE-BASED PRODUCTION OF HIGH ETHANOL CONTENT SOLUTIONS

(71) Applicant: Sandymount Technologies Corporation, Woburn, MA (US)

(72) Inventor: Ronan McGovern, Cambridge, MA (US)

(73) Assignee: Alfa Laval Copenhagen A/S, Soborg (DK)

(*) Notice: Subject to any disclaimer, the term of this patent is extended or adjusted under 35 U.S.C. 154(b) by 633 days.

(21) Appl. No.: 16/978,030

(22) PCT Filed: Mar. 15, 2019

(86) PCT No.: PCT/US2019/022407
§ 371 (c)(1),
(2) Date: Sep. 3, 2020

(87) PCT Pub. No.: WO2019/178442
PCT Pub. Date: Sep. 19, 2019

(65) Prior Publication Data
US 2021/0001272 A1    Jan. 7, 2021

Related U.S. Application Data

(60) Provisional application No. 62/702,718, filed on Jul. 24, 2018, provisional application No. 62/643,547, filed on Mar. 15, 2018.

(51) Int. Cl.
*C12H 3/04* (2019.01)
*B01D 61/02* (2006.01)
(Continued)

(52) U.S. Cl.
CPC ............ *B01D 61/026* (2022.08); *A23L 2/385* (2013.01); *A23L 2/74* (2013.01); *B01D 3/001* (2013.01);
(Continued)

(58) Field of Classification Search
CPC ............... B01D 61/027; B01D 61/025; B01D 61/145; B01D 69/02; B01D 2311/04;
(Continued)

(56) References Cited

U.S. PATENT DOCUMENTS

| 4,499,117 A | 2/1985 | Bonneau |
| 4,532,140 A | 7/1985 | Bonnome |

(Continued)

OTHER PUBLICATIONS

USPTO; International Search Report and Written Opinion dated Jun. 7, 2019 for PCT application No. PCT/US19/22407 (14 pages).

*Primary Examiner* — Hong T Yoo
(74) *Attorney, Agent, or Firm* — Sunstein LLP

(57) ABSTRACT

A method for producing an ethanol solution includes obtaining, from a starting liquid, a liquid feed having less than by weight of constituents and having 3% to 25% by weight of ethanol, supplying the liquid feed to a feed stream inlet of a reverse osmosis separation system having a first pass, wherein (i) each pass has an reverse osmosis membrane filtration unit, each membrane filtration unit having an ethanol rejection percentage of between 50% to 99%, and (ii) each pass has the feed stream inlet for a feed stream, a permeate stream outlet for a permeate stream, and a retentate stream outlet for a retentate stream, operating the system to maintain pressure in one of the membrane filtration units in a range of 1,200 to 4,000 psi, and obtaining retentate that is enriched with ethanol, the retentate differs from the starting liquid by absence of the removed constituents.

19 Claims, 7 Drawing Sheets

(51) Int. Cl.
  *C12H 6/02* (2019.01)
  *A23L 2/385* (2006.01)
  *A23L 2/74* (2006.01)
  *B01D 3/00* (2006.01)
  *B01D 61/04* (2006.01)
  *B01D 61/14* (2006.01)
  *B01D 61/58* (2006.01)

(52) U.S. Cl.
  CPC ......... *B01D 61/025* (2013.01); *B01D 61/027* (2013.01); *B01D 61/04* (2013.01); *B01D 61/145* (2013.01); *B01D 61/58* (2013.01); *C12H 3/04* (2019.02); *C12H 6/02* (2019.02); *A23V 2002/00* (2013.01); *B01D 2311/04* (2013.01); *B01D 2311/08* (2013.01); *B01D 2311/10* (2013.01); *B01D 2311/14* (2013.01); *B01D 2311/25* (2013.01); *B01D 2311/2649* (2013.01); *B01D 2311/2669* (2013.01)

(58) Field of Classification Search
  CPC ................ B01D 61/58; B01D 2311/06; B01D 61/146; B01D 2311/08; B01D 61/14; B01D 2317/022; B01D 61/04; B01D 61/1471; B01D 2325/34; B01D 61/029; B01D 61/026; B01D 61/02; B01D 2321/12; B01D 53/1418; B01D 3/001; C12H 3/00; C12H 3/04; C12H 6/02; A23L 2/385; A23L 2/70; A23L 2/72; A23L 2/74
  See application file for complete search history.

(56) References Cited

U.S. PATENT DOCUMENTS

| | | |
|---|---|---|
| 4,999,209 A | 3/1991 | Gnekow |
| 8,252,350 B1 | 8/2012 | Cadwalader et al. |
| 2008/0272041 A1 | 11/2008 | Wollan |

MEMBRANE-BASED PRODUCTION OF HIGH ETHANOL CONTENT SOLUTIONS

CROSS-REFERENCE TO RELATED APPLICATIONS

This application is a national phase entry of International Application No. PCT/US2019/022407, filed Mar. 15, 2019, and claims priority to U.S. Provisional Application No. 62/702,718, filed Jul. 24, 2018, and U.S. Provisional Application No. 62/643,547, filed Mar. 15, 2018, the disclosures of which are incorporated by reference herein in their entirety.

TECHNICAL FIELD

The present invention relates to methods and systems for producing solutions having high ethanol content, and more particularly to methods and systems for solutions having high ethanol content using membranes.

BACKGROUND ART

Various systems and methods are known for concentrating beers and wines using reverse osmosis (RO). Galzy (in U.S. Pat. No. 4,610,887) and Fricker (in U.S. Pat. No. 4,792,402) disclose RO processes—which may be hybridized with distillation—to produce a high alcohol-by-volume (ABV) fermented juice. Bonnome (in U.S. Pat. No. 4,532,140) discloses a two-pass RO system in which retentates are mixed to form a high alcohol beer and wine concentrate. Disclosed also are systems and methods for the production of non-alcoholic beverages, such as by Bonneau (in U.S. Pat. No. 4,499,117) and Gnekow (in U.S. Pat. No. 4,999,209), involving multi-step membrane processes with ultrafiltration (UF) and RO, geared towards retaining all compounds other than ethanol and water.

SUMMARY OF THE EMBODIMENTS

In accordance with one embodiment of the invention, a method for producing an ethanol solution from a starting liquid is provided. The method includes obtaining, from the starting liquid having an ethanol component, a liquid feed having less than 0.5%, and preferably less than 0.1%, by weight of constituents selected from the group consisting of proteins, pectins, starches, sugars, and combinations thereof, and having 3% to 25% by weight of ethanol, by deriving the liquid feed as a permeate resulting from at least one pass of a process selected from the group consisting of reverse osmosis filtration, nanofiltration, ultrafiltration, and combinations thereof, each pass of the process having a molecular weight cutoff to remove from the permeate constituents within a range between 100 and 30,000 grams per mole, and, optionally, between 20 and 30,000 grams per mole. The method further includes supplying the liquid feed to the feed stream inlet of a reverse osmosis separation system, such system having at least a first pass, wherein (i) each pass of the system has at least one reverse osmosis membrane filtration unit, each membrane filtration unit having an ethanol rejection percentage of 50% 99%, and (ii) each pass has a feed stream inlet for a feed stream, a permeate stream outlet for a permeate stream, and a retentate stream outlet for a retentate stream, and operating the system to maintain pressure in at least one of the filtration units in a range of about 1,200 to about 4,000 psi. The method further includes obtaining retentate, from the retentate outlet of the first pass of the reverse osmosis separation system, that is enriched with ethanol, wherein the retentate differs from the starting liquid by absence of the removed constituents. Optionally, the method includes using the retentate to make an ethanol solution without adding back any of the removed constituents.

In a related embodiment, the method further includes distilling the retentate from the retentate outlet of the first pass, so as to form an ethanol distillate. Optionally, the ethanol distillate is between 80 and 195 proof ethanol. In another related embodiment, the processes of supplying the liquid feed to the feed stream inlet of the first pass of the reverse osmosis separation system and of obtaining retentate are carried out while maintaining temperature of liquid in the at least one reverse osmosis membrane filtration unit in a range between a freezing point of the liquid feed and 10° C.

In another related embodiment, deriving the liquid feed as the permeate resulting from the at least one pass includes operating the at least one pass at a temperature in a range between the freezing point of the liquid feed and 25° C. In a related embodiment, deriving the liquid feed includes operating the first pass of the process at a pressure in a range of 100 psi to 1,200 psi. Optionally, the process is selected from the group consisting of nanofiltration, ultrafiltration, and combinations thereof, and deriving the liquid feed includes operating the first pass of the process in a range of 200 psi to 800 psi.

In yet another related embodiment, the reverse osmosis separation system has at least first and second passes, and the feed stream of the second pass is coupled to the first pass permeate stream outlet, the method further includes recycling retentate from the retentate stream outlet of the second pass to the feed stream inlet of the first pass. Optionally, the second pass of the reverse osmosis separation system yields a permeate having ethanol in a range of 0.01% to 10% by weight. Optionally, the second pass of the reverse osmosis separation system yields a permeate having ethanol in a range of 0.01% to 1% by weight.

In a further related embodiment, supplying the liquid feed includes supplying the liquid feed to the feed stream inlet of a reverse osmosis separation system having a second pass, in which the permeate of the first pass is fed to the second pass and each pass yields a retentate, the method further including combining the retentate of the first pass with the retentate of the second pass to yield a non-alcoholic beverage concentrate. Optionally, the method further includes combining the permeate stream of the reverse osmosis separation system with the non-alcoholic beverage concentrate to form a non-alcoholic beverage. Optionally, the method further includes recycling permeate from the reverse osmosis separation system so as to be combined with the starting liquid.

In another related embodiment, supplying the liquid feed includes supplying the liquid feed to the feed stream inlet of a reverse osmosis separation system having a second pass configured to operate at a pressure in a range of 400 psi to 1,500 psi. Optionally, the the second pass is configured to operate at a pressure in a range of 800 psi to 1,200 psi.

In yet another related embodiment, the starting liquid is an alcoholic beverage. Optionally, the starting liquid includes ethanol in a range of 1% to 40% by weight. Optionally, the starting liquid includes ethanol in a range of 3% to 25% by weight.

In another related embodiment, the liquid feed has 3% or greater by weight of ethanol. Optionally, the retentate from the first pass of the reverse osmosis separation system has an ethanol concentration in a range of 10% to 60% by weight. In a related embodiment, the retentate from the first pass of the reverse osmosis separation system has an ethanol concentration in a range of 20% to 40% by weight.

In other related embodiments, obtaining the liquid feed includes deriving it from the starting liquid via a diafiltration process that employs an external source of water, and wherein the reverse osmosis separation system includes at least two passes, so as also to produce a non-alcoholic beverage that is derived from the retentate outlet of a last pass of the reverse osmosis separation system. Optionally, the external source of water is permeate from the reverse osmosis system.

Another set of embodiments provides systems, for producing an ethanol solution from a starting liquid having an ethanol component, each of the systems corresponding to a distinct one of the above methods. One system embodiment includes a first filtration system and a reverse osmosis system. The first filtration system provides at least one pass, the first filtration system selected from the group consisting of reverse osmosis filtration, nanofiltration, ultrafiltration, and combinations thereof, each pass having a molecular weight cutoff to remove from the permeate constituents within a range between 100 and 30,000 grams per mole. The first filtration system has a starting liquid input, the first filtration system being configured to produce, as a permeate, a liquid feed output feed, from the starting liquid input, having less than 0.5%. and preferably less than 0.1%, by weight of constituents selected from the group consisting of proteins, pectins, starches, sugars, and combinations thereof, and having 3% to 25% by weight of ethanol. The reverse osmosis separation system has at least a first pass, wherein (i) each pass of the reverse osmosis separation system has at least one reverse osmosis membrane filtration unit, each membrane filtration unit having an ethanol rejection percentage of 50% to 99%, (ii) each pass has a feed stream inlet for a feed stream, a permeate stream outlet for a permeate stream, and a retentate stream outlet for a retentate stream, (iii) the feed inlet of the first pass is coupled to the liquid feed; (iv) a controller-operated pump coupled to the reverse osmosis separation system and configured to maintain pressure in at least one of the filtration units in a range of about 1,200 to about 4,000 psi; and (v) the retentate stream outlet of a last pass of the reverse osmosis separation system differs from the starting liquid by absence of the removed constituents.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

Disclosed herein are systems and methods for producing aqueous ethanol solutions that are enriched in ethanol and relatively devoid of other compounds. Such solutions may serve as a beverage without further modification (in which case presence in the solutions of very small amounts of low molecular weight aromatic compounds would contribute flavor), as a plain ethanol base for a beverage, or as a feed solution for a thermal distillation process that is greatly reduced in size and operating cost compared to what is typically required to produce a high proof spirit. Also provided herein are integrated configurations for the co-production of non-alcoholic beverages and enriched aqueous ethanol solutions. In certain applications, one or more embodiments disclosed herein enable the production of a high ABV beverage. In other applications, one or more embodiments disclosed herein enable the production of a plain ethanol base that may serve in the formulation of an alcoholic beverage. In further applications, one or more embodiments disclosed herein enable the co-production of a non-alcoholic beverage (or non-alcoholic beverage concentrate) and a plain ethanol base. In other applications still, one or more embodiments disclosed herein, in combination with thermal distillation, enable the production of a high proof spirit.

Figure 1:
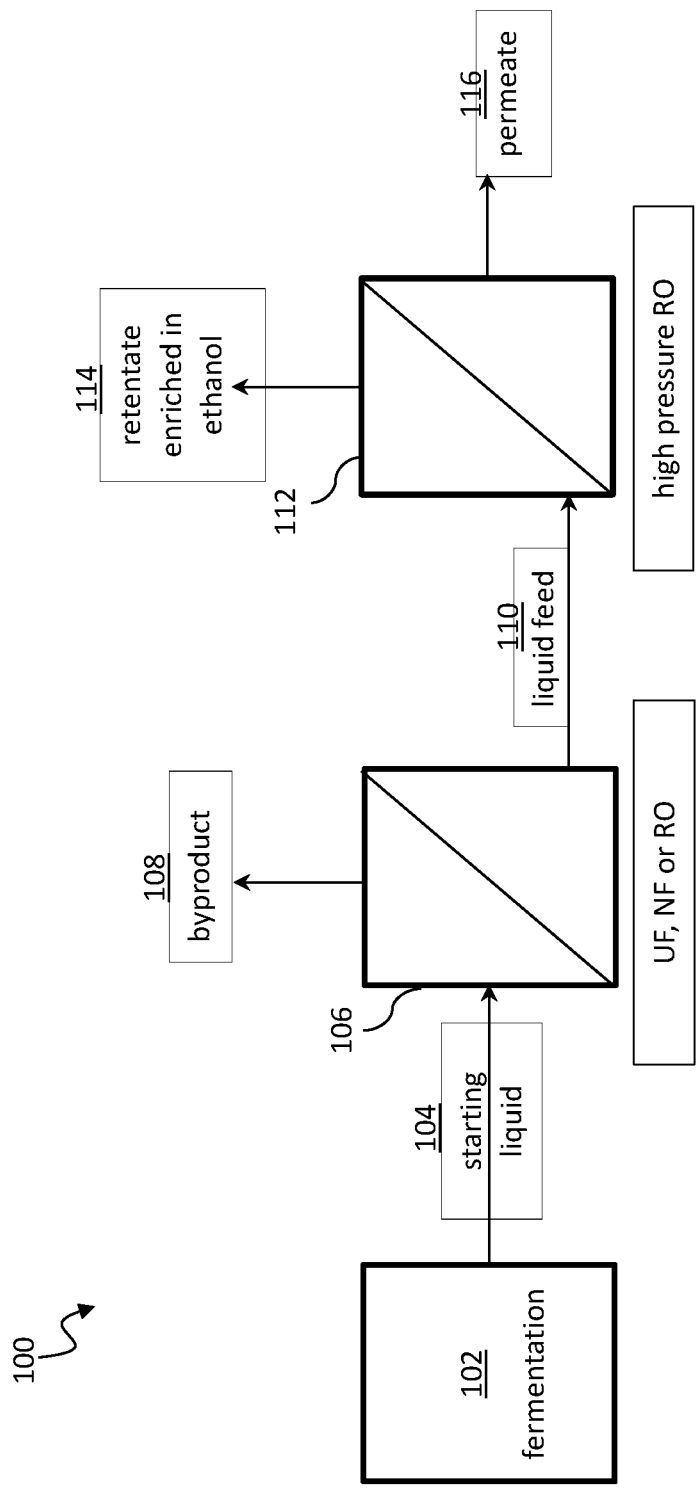
FIG. 1 is a diagram of an exemplary process for producing an ethanol solution from a starting liquid, in accordance with an embodiment of the invention.

FIG. 1 is a diagram of an exemplary process 100 for producing an ethanol solution from a starting liquid, in accordance with an embodiment of the invention. Fermentation 102 gives rise to a starting liquid 104, having a range of 1% to 40% ethanol by weight and, typically, a range of 3% to 17% ethanol by weight. In certain embodiments, the starting liquid 104 is an alcoholic beverage, such as beer, cider, or wine. The starting liquid 104 is then subjected to at least one pass of reverse osmosis (RO) filtration, nanofiltration (NF), or ultra-filtration (UF) 106 to produce a retentate byproduct 108 that is enriched in constituents such as proteins, starches, pectins, and/or sugars relative to the starting liquid 104. The process 106 also produces a liquid feed 110 having less than 0.5%, and preferably, less than 0.1%, by weight of proteins, pectins, starches, and/or sugars. In some embodiments, the liquid feed 110 has 3% or greater by weight of ethanol. In some embodiments, the liquid feed 110 has up to 25% by weight of ethanol. In certain embodiments, the temperature of operation in process 106 is in a range from the freezing point of the starting liquid 104 to twenty-five degrees Celsius, and typically in a range from the freezing point of the liquid 104 to ten degrees Celsius. In some embodiments, the pressure applied in the process 106 is in a range of 100 psi to 1,200 psi.

In exemplary process 100, the liquid feed 110 is subjected to at least one pass of high-pressure RO process 112, resulting in a retentate 114 that is enriched in ethanol relative to the liquid feed 110, and a permeate 116 that is enriched in water relative to the liquid feed 110. In this embodiment, the operating pressure of the high-pressure RO process is between 1,200 psi and 4,000 psi. The operating temperature of the high-pressure RO process in this embodiment is in a range from the freezing point of the liquid feed to 10 degrees Celsius. Also in this embodiment, the RO membranes used in the high-pressure RO process 112 have salt rejection of 98% to 99.95% when tested under standard seawater test conditions (at a pressure of 800 psi, with 32,000 ppm NaCl, at 25° C., and at 8% recovery). Typically, the salt rejection rate of the RO membranes at standard conditions is in a range of 99.7% to 99.95%. Also in this embodiment, each membrane in the high-pressure RO process has an ethanol rejection percentage of at least 50% or at least 75%. In an exemplary embodiment, each membrane has an ethanol rejection percentage of up to 99%. Ethanol rejection percentage can be defined by the following relationship, when operating a test system with standard 4 inch or 8 inch reverse osmosis elements at 800 psi, 25 degrees Celsius, and a recovery ratio of 8%:

ethanol rejection percentage=100%−(permeate ethanol/feed ethanol)

In FIG. 1, exemplary retentate 114 enriched in ethanol has an ethanol concentration in a range of 10% to 60% by weight, and typically, in a range of 20% to 40% by weight. This retentate 114 may constitute a final beverage product that is relatively devoid of taste and aroma (other than that of ethanol) or a beverage product exhibiting small molecule aromatics (low molecular weight esters and alcohols). The retentate 114 may also be carbonated, nitrogenated, and/or blended with water, juices, natural flavors, artificial flavors, and/or fermented beverages (other than the byproducts obtained in producing the liquid feed using UF, NF, or RO).

Figure 2:
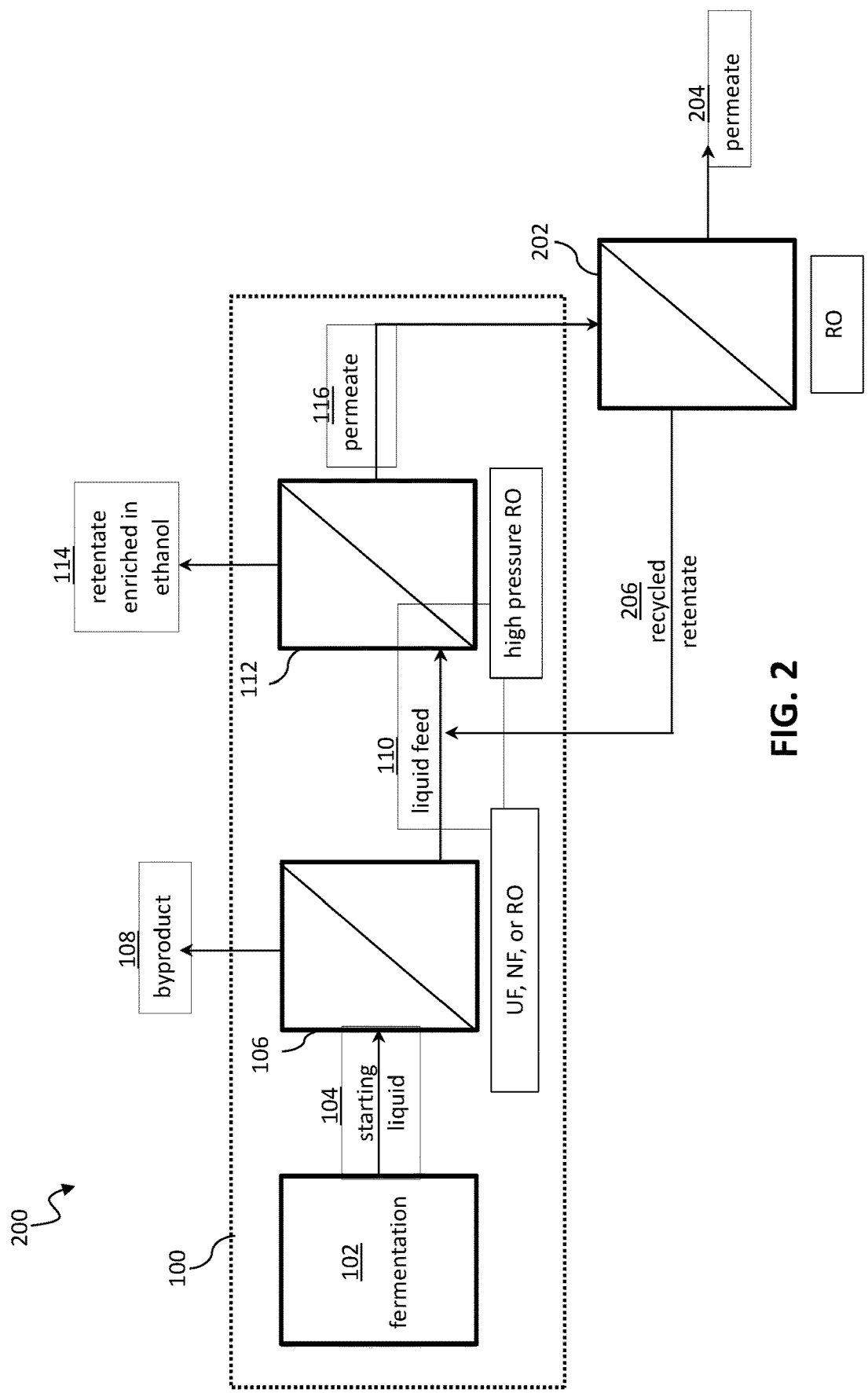
FIG. 2 is a diagram of an exemplary process 200 for producing an ethanol solution, in accordance with another embodiment of the invention.

FIG. 2 is a diagram of an exemplary process 200 for producing an ethanol solution, in accordance with another embodiment of the invention. The process 200 includes process 100 of FIG. 1. However, in the embodiment of FIG. 2, the high-pressure RO pass 112 of process 100 is coupled to a second RO pass 202 to recover ethanol from the permeate 116. The additional RO pass 202 yields a retentate stream 206 that is recycled to the liquid feed 110 having an increased ethanol concentration relative to permeate 116. The pass 202 also yields a permeate stream 204 that is reduced in ethanol concentration relative to the permeate 116 from the high pressure RO pass 112. In some embodiments, this second RO pass 202 can be a high pressure RO unit, employing hydraulic pressures of between 1,200 psi and 4,000 psi. In some embodiments, the second RO pass 202 can operate at pressures between 800 psi and 1,200 psi. The resulting permeate 204 can have an ethanol content in a range of 0.01% to 10% by weight, and, typically, in a range of 0.01% to 1% by weight. Further stages and passes of reverses osmosis may also be added to achieve the desired level of purity of the final permeate stream.

Figure 3:
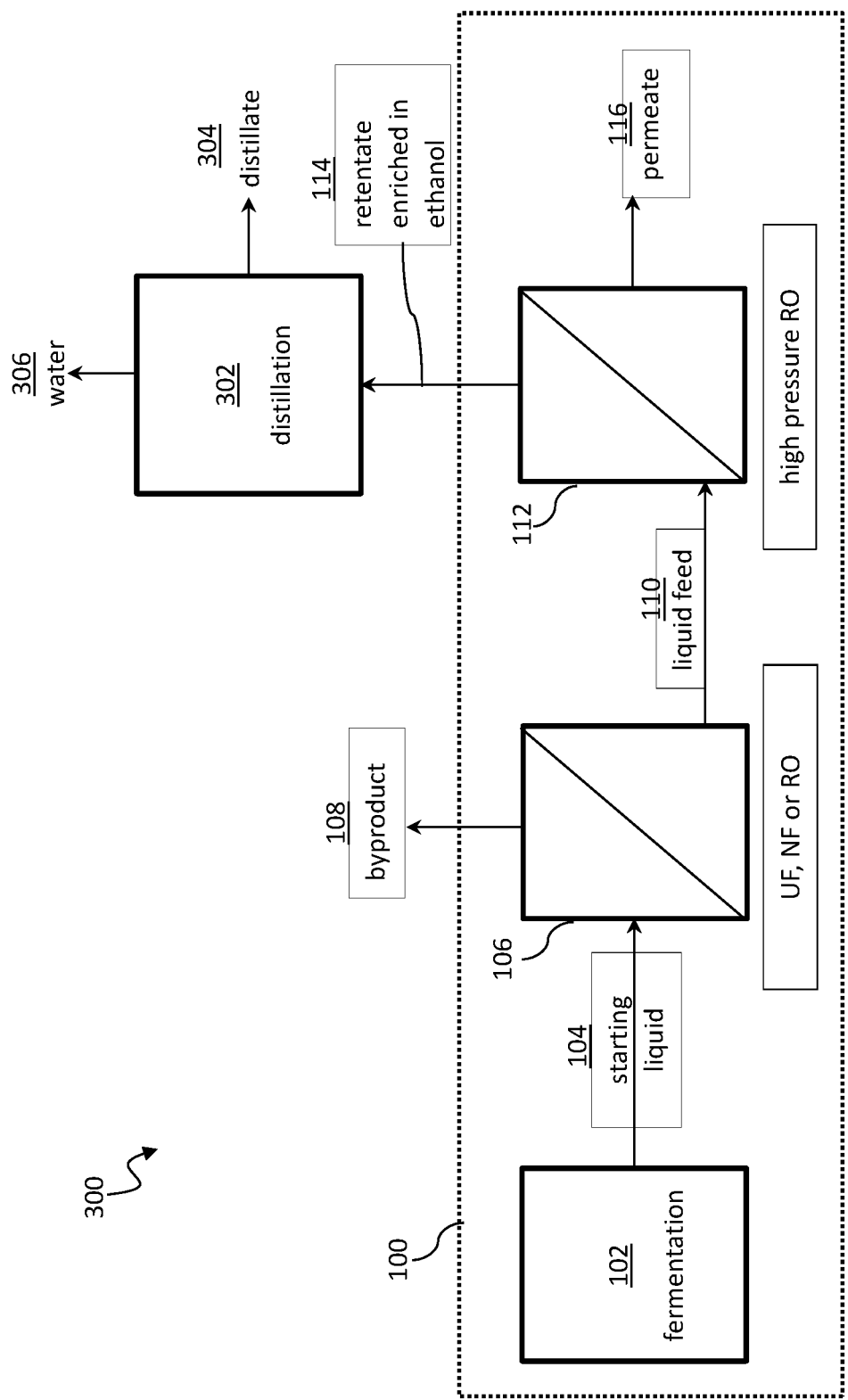
FIG. 3 is a diagram of an exemplary process 300 for producing an ethanol solution and a distillate, in accordance with another embodiment of the invention.

FIG. 3 is a diagram of an exemplary process 300 for producing an ethanol solution and a distillate, in accordance with another embodiment of the invention. The process 300 again includes the process 100 from FIG. 1, but with a further modification wherein the retentate 114, which is enriched in ethanol, is subjected to distillation in process 302 to form an ethanol distillate 304 and a water fraction 306. In some embodiments, retentate 114 can include a range of 20% to 40% ethanol by weight. In some embodiments, the distillate 302 can include a range of 80 to 195 proof ethanol.

The distillation process 302 may involve a pot still, a distillation column, or other forms of thermal distillation (including membrane distillation).

Figure 4:
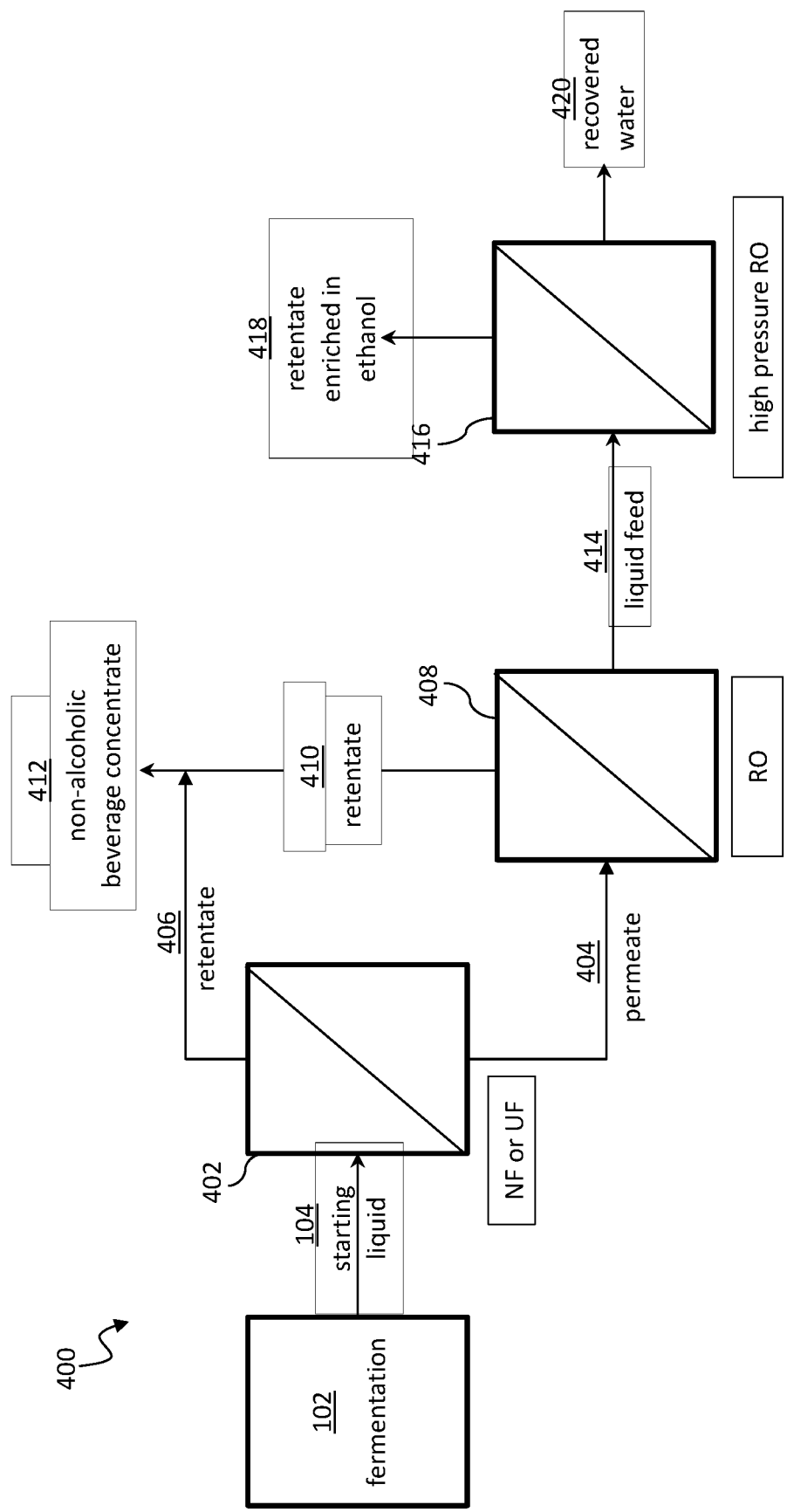
FIG. 4 is a diagram of an exemplary process 400 for producing an ethanol solution and a non-alcoholic beverage concentrate, in accordance with another embodiment of the invention.

FIG. 4 is a diagram of an exemplary process 400 for producing an ethanol solution and a non-alcoholic beverage concentrate, in accordance with another embodiment of the invention. In process 400, starting liquid (from fermentation process 102) is subjected to nanofiltration or ultrafiltration pass 402, yielding a permeate 404 and retentate 406. The pass 402 may operate at a pressure in a range of 200 psi to 800 psi. The permeate 404 is fed into a second pass of reverse osmosis 408, which may operate at a pressure in a range of 400 psi to 1,500 psi, and typically, in a range of 800 psi to 1,200 psi. The standard salt rejection of membranes in the nanofiltration process 402 is in a range of 0% to 80% and the standard salt rejection of the membranes in the reverse osmosis step is in a range of 90% to 99.9%.

In the exemplary process 400, retentate 406 from the nanofiltration or ultrafiltration pass 402 and retentate 410 from the reverse osmosis pass 408 may be blended to form a non-alcoholic beverage concentrate 412. In this embodiment, although the membranes of units 402 and 408 pass ethanol, some ethanol remains on their respective retentate sides. In another embodiment, some water is added to the starting liquid to ensure a lower final ABV in the non-alcoholic beverage. In related embodiments, the added water is recovered water in the form of permeate from the reverse osmosis system 416 that is supplied with the liquid feed 414. (A further example of this approach is described in connection with FIG. 7.) Thus, in creating what is termed a non-alcoholic beverage, there remains some ethanol in retentates 406 and 410. This non-alcoholic beverage is 0.5% ABV or lower. In such embodiments, the starting liquid 104 may be a beer or fermented fruit juice with an ethanol content in a range defined by 3% and 12% by weight, typically, in a range of 3% to 6% by weight. In this case, the permeate 404 from the nanofiltration (or ultrafiltration) step 402 may contain no more than 0.1% by weight of proteins, starches, pectins, and/or sugars. The liquid feed 414 may contain no more than 0.1% by weight of proteins, starches, pectins, and/or sugars, and in a range of 80% to 99.9% of the ethanol concentration by weight of the starting liquid 104. The retentate enriched in ethanol is in a range of 3% to 60% by weight, and typically in a range of 20% to 40% ethanol by weight. The liquid feed 414 is fed into a high-pressure RO process 416. This high-pressure RO step 416 yields a retentate enriched in ethanol 418 and a permeate (recovered water) 420.

Optionally, at any point before or after the nanofiltration/ultrafiltration step 402, deaerated water may be blended in from an external source. A non-alcoholic beverage concentrate 412 is obtained by blending at least a portion of the retentates 406 and 410 from the nanofiltration/ultrafiltration and the reverse osmosis steps, 402 and 408, respectively. This non-alcoholic beverage concentrate 412 may have ethanol content in a range of 0.01 to 12% by weight and typically in a range of 3% to 8% ethanol by weight. This non-alcoholic beverage concentrate 412 can then be blended with deaerated water and carbonated or nitrogenated to create a final non-alcoholic beverage.

Figure 5:
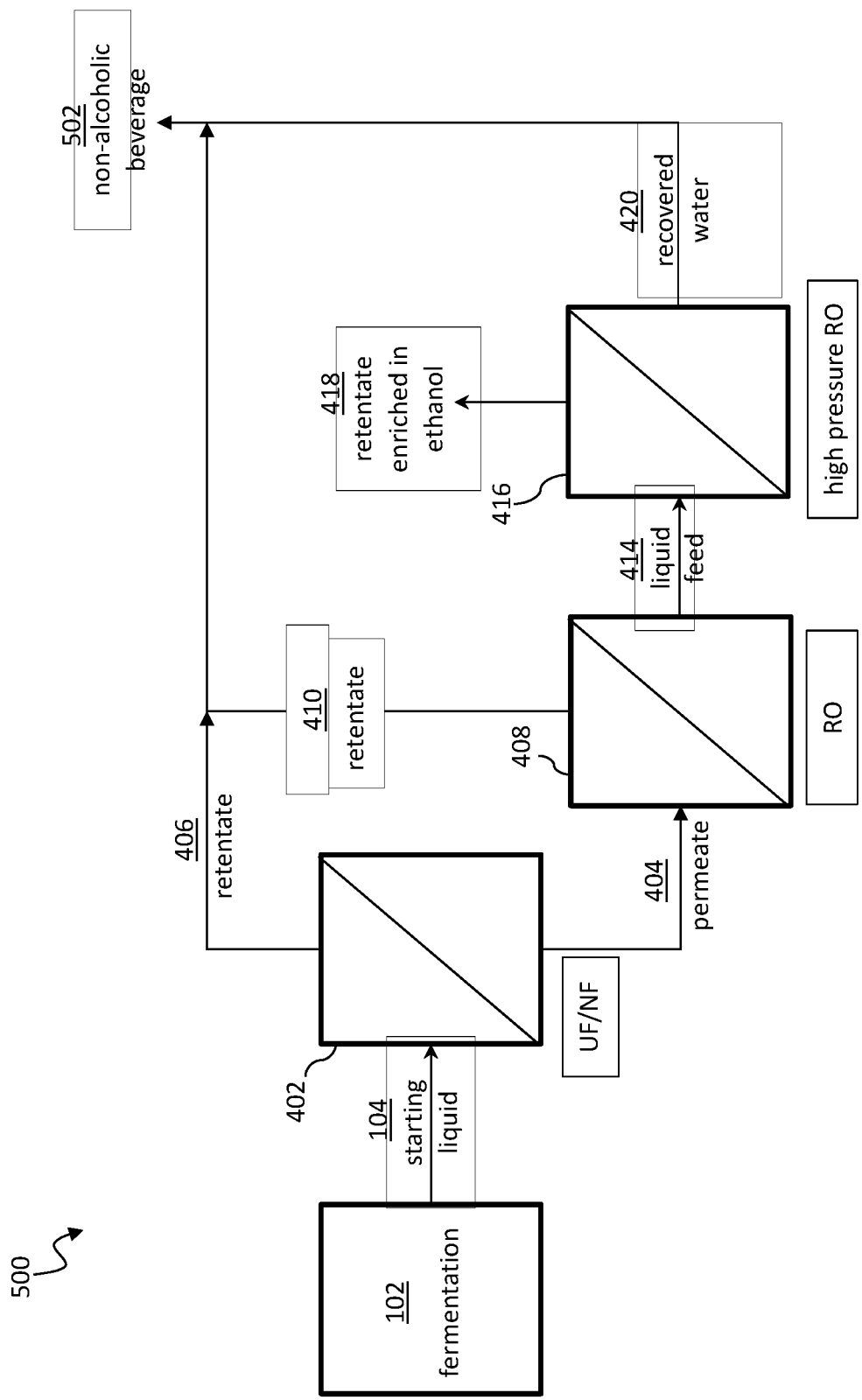
FIG. 5 is a diagram of a process 500 for producing an ethanol solution and a non-alcoholic beverage, in accordance with another embodiment of the invention.

FIG. 5 is a diagram of a process 500 for producing an ethanol solution and a non-alcoholic beverage, in accordance with another embodiment of the invention. Process 500 includes many of the components of process 400, and where the components are similar the same item numbers are used as in FIG. 4. The distinction between process 500 and process 400 is that retentates 406 and 410 derived from processes 402 and 408 are blended with at least a portion of the recovered water 420 from the high pressure reverse osmosis step to form a non-alcoholic beverage 502. The ethanol content of the non-alcoholic beverage is in a range of 0.01% to 1.5% by volume and typically in a range of 0.3 to 0.5% by volume.

Figure 6:
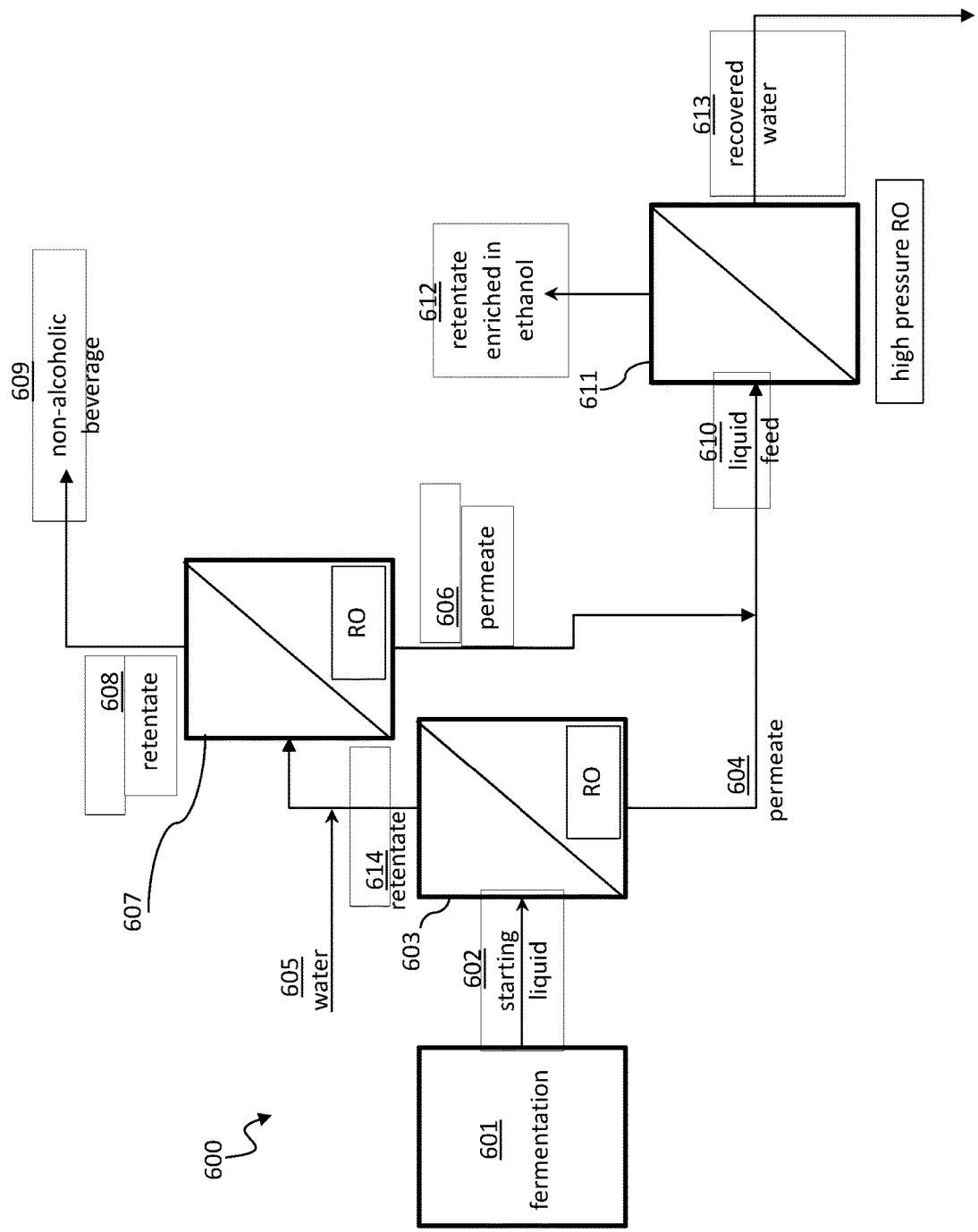
FIG. 6 is a diagram of a process 600 for producing an ethanol solution and a non-alcoholic beverage, in accordance with another embodiment of the invention.

FIG. 6 is a diagram of a process 600 for producing an ethanol solution and a non-alcoholic beverage, in accordance with yet another embodiment of the invention. The method of FIG. 6 is similar to that of FIG. 1, in which, however, the liquid feed is derived from the starting liquid via a process of diafiltration, also producing a non-alcoholic beverage. In the process of FIG. 6, starting liquid 602 is subjected to reverse osmosis in process 603 at pressures of 200-1,200 psi and temperatures of 15° C.-30° C. with membranes exhibiting an ethanol rejection percentage of 1% to 50%. The retentate 614 is then diluted with water 605 from an external source. This water may be distilled water, demineralized water, filtered water or adjustment water. Typically the level of dissolved oxygen in the water 605 should be between 1 and 200 ppb, and, preferably, between 1 and 50 ppb. This diluted stream is then subjected to further reverse osmosis in process 607—again at pressures of 200-1,200 psi and temperatures of 15° C.-30° C., and with membranes exhibiting an ethanol rejection percentage of 1% to 50%. The retentate 608 may constitute a non-alcoholic beverage, which may also be diluted with water, carbonated, filtered with microfiltration, or blended with other flavors to form a final product. Permeates 604 and 606 are directed to a step of high pressure reverse osmosis in process 611 involving pressures of between 1,200 psi and 4,000 psi, temperatures between the freezing point of the liquid and 15° C., and with membranes exhibiting and an ethanol rejection percentage of between 50% and 99%. Process 611 results in a retentate 612 that is fortified in ethanol, and a permeate 613 that is lower in ethanol concentration than the liquid feed 610. Optionally, a portion of the permeate 613 may be employed as recovered water for use as a source of water 605. The recovered water is between 0.01% and 2% ethanol by weight and typically between 0.01% and 0.1% ethanol by weight. The ethanol content of the non-alcoholic beverage is between 0.01% and 1.5% by volume and typically between 0.3 and 0.5% by volume.

Figure 7:
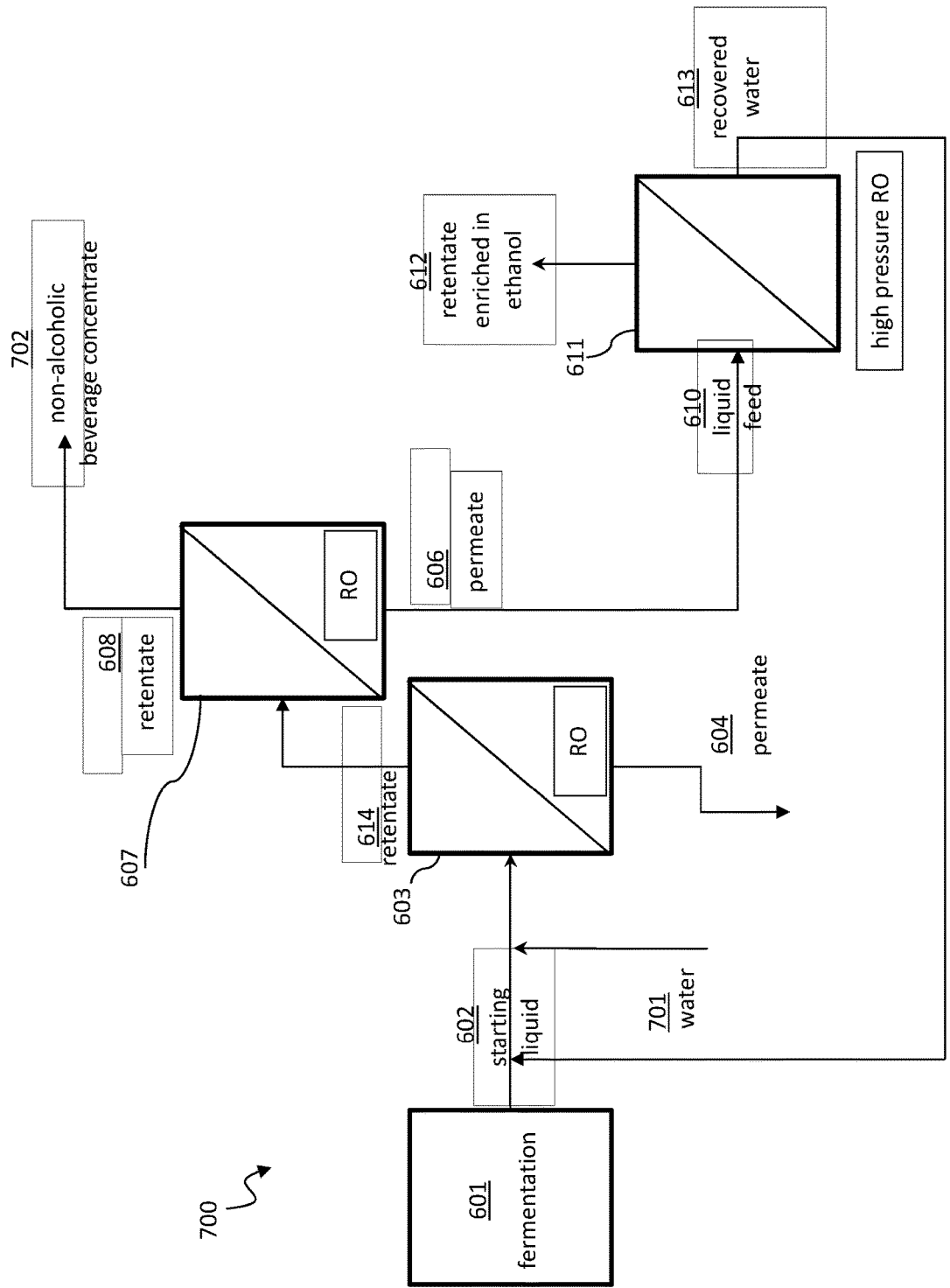
FIG. 7 is a diagram of a process 700 for producing an ethanol solution and a non-alcoholic beverage, in accordance with another embodiment of the invention.

FIG. 7 is a diagram of a process 700 for producing an ethanol solution and a non-alcoholic beverage, in accordance with another embodiment of the invention. Process 700 includes many of the components of process 600, and, where the components are similar, the same item numbers are used as in FIG. 6. The distinction between process 700 and process 600 is that the starting liquid of process 700 may also be diluted with water 701 derived from any or all of permeate 604, and permeate 613 (FIG. 7 shows the permeate 613 being used) to produce non-alcoholic beverage concentrate 702. Alternatively the water may be added in a different location, namely it can be added to the flow from retentate 614 of unit 603 to the inlet of unit 607, and the water can be similarly derived as discussed in the previous sentence. Permeate 604 is between 0.01% and 3% ethanol by weight, and typically between 0.01% and 0.5%. The recovered water 613 is between 0.01% and 2% ethanol by weight and typically between 0.01% and 0.1% ethanol by weight. The ethanol content of the non-alcoholic beverage concentrate 702 is 0.01% to 15% by weight and typically in a range of 11% to 15% ethanol by weight. This non-alcoholic beverage concentrate 702 can then be blended with deaerated water and carbonated or nitrogenated to create a final non-alcoholic beverage.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision not to present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method for producing an ethanol solution from a starting liquid having an ethanol component, the method comprising:

obtaining, from the starting liquid, a liquid feed having less than 0.5% by weight of constituents selected from the group consisting of proteins, pectins, starches, sugars, and combinations thereof, and having 3% to 25% by weight of ethanol, by deriving the liquid feed as a permeate resulting from at least one pass of a filtration process selected from the group consisting of reverse osmosis filtration, nanofiltration, ultrafiltration, and combinations thereof, each pass of the filtration process having a molecular weight cutoff to remove, from the permeate, constituents within a range between about 100 and 30,000 grams per mole;

supplying the liquid feed to a feed stream inlet of a reverse osmosis separation system, the reverse osmosis separation system having at least a first pass, wherein (i) each pass of the reverse osmosis separation system has at least one reverse osmosis membrane filtration unit, each membrane filtration unit having an ethanol rejection percentage of between about 50% to 99%, and (ii) each pass has the feed stream inlet for a feed stream, a permeate stream outlet for a permeate stream, and a retentate stream outlet for a retentate stream; and operating the reverse osmosis separation system to maintain pressure in at least one of the membrane filtration units in a range of about 1,200 to about 4,000 psi; and obtaining retentate, from the retentate stream outlet of the first pass of the reverse osmosis separation system, that is enriched with ethanol, wherein the retentate differs from the starting liquid by absence of the removed constituents.

P2. A method according to claim P1, further comprising using the retentate to make the ethanol solution without adding back any of the removed constituents.

P3. A method according to claim P1 or P2, further comprising distilling the retentate from the retentate stream outlet of the first pass, so as to form an ethanol distillate.

P4. A method according to claim P3, wherein the ethanol distillate is between about 80 and 195 proof ethanol.

P5. A method according to any one of claims P1 to P4, wherein processes of supplying the liquid feed to the feed stream inlet of the first pass of the reverse osmosis separation system and of obtaining the retentate are carried out while maintaining a temperature of liquid in the at least one reverse osmosis membrane filtration unit in a range between a freezing point of the liquid feed and 10° C.

P6. A method according to any one of claims P1 to P5, wherein deriving the liquid feed as the permeate resulting from the at least one pass includes operating the at least one pass at a temperature in a range between about 15 and 35° C.

P7. A method according to any one of claims P1 to P6, wherein deriving the liquid feed includes operating the first pass of the filtration process at a pressure in a range of about 100 psi to 1,200 psi.

P8. A method according to claim P7, wherein the filtration process is selected from the group consisting of nanofiltration, ultrafiltration, and combinations thereof, and deriving the liquid feed includes operating the first pass of the filtration process in a range of about 200 psi to 800 psi.

P9. A method according to any one of claims P1 to P8, wherein the reverse osmosis separation system has at least first and second passes, and the feed stream of the second pass is coupled to the first pass permeate stream outlet, the method further comprising:
recycling the retentate from the retentate stream outlet of the second pass to the feed stream inlet of the first pass.

P10. A method according to claim P9, wherein the second pass of the reverse osmosis separation system yields a permeate having ethanol in a range of about 0.01% to 10% by weight.

P11. A method according to claim P10, wherein the second pass of the reverse osmosis separation system yields a permeate having ethanol in a range of about 0.01% to 1% by weight.

P12. A method according to any one of claims P1 to P11, wherein supplying the liquid feed includes supplying the liquid feed to the feed stream inlet of the reverse osmosis separation system having a second pass, in which the permeate of the first pass is fed to the second pass and each pass yields a retentate, the method further comprising:
combining the retentate of the first pass with the retentate of the second pass to yield a non-alcoholic beverage concentrate.

P13. A method according to claim P12, further comprising combining the permeate stream of the reverse osmosis separation system with the non-alcoholic beverage concentrate to form a non-alcoholic beverage.

P14. A method according to any one of claims P1 to P13, wherein supplying the liquid feed includes supplying the liquid feed to the feed stream inlet of the reverse osmosis separation system having a second pass configured to operate at a pressure in a range of about 400 psi to 1,500 psi.

P15. A method according to claim P14, wherein the second pass is configured to operate at a pressure in a range of about 800 psi to 1,200 psi.

P16. A method according to any one of claims P1 to P15, wherein the starting liquid is an alcoholic beverage.

P17. A method according to claim P16, wherein the starting liquid includes ethanol in a range of about 1% to 40% by weight.

P18. A method according to claim P17, wherein the starting liquid includes ethanol in a range of about 3% to 25% by weight.

P19. A method according to any one of claims P1 to P18, wherein the liquid feed has 3% or greater by weight of ethanol.

P20. A method according to any one of claims P1 to P19, wherein the retentate from the first pass of the reverse osmosis separation system has an ethanol concentration in a range of about 10% to 60% by weight.

P21. A method according to claim P20, wherein the retentate from the first pass of the reverse osmosis separation system has the ethanol concentration in a range of about 20% to 40% by weight.

P22. A method according to any one of claims P1 to P20, wherein obtaining the liquid feed includes obtaining the liquid feed having less than about 0.1% by weight of the constituents.

P23. A method according to claim P1, wherein obtaining the liquid feed includes deriving it from the starting liquid via a reverse osmosis diafiltration process that employs a source of water, so as to produce a non-alcoholic beverage that is derived from a retentate outlet of the reverse osmosis diafiltration process.

P24. A method of according to claim P23, where the source of water is permeate derived from the reverse osmosis separation system being supplied with the liquid feed.

P25. A method of according to claim P23, where the source of water is derived from a permeate outlet of the reverse osmosis dia-filtration process.

P26. A method of according to claim P25, where the source of water is derived from a permeate outlet from a first stage of the reverse osmosis dia-filtration process.

P27. A method according to any one of claims P1 to P26, wherein deriving the liquid feed includes operating the first pass of the filtration process at a pressure in a range of about 1,200 psi to 3,000 psi.

P28. A method according any one of claims P1 to P27, wherein each pass of the filtration process has the molecular weight cutoff to remove, from the permeate, the constituents within a range between about 20 and 30,000 grams per mole.

P29. A system for producing an ethanol solution from a starting liquid having an ethanol component, the system comprising:
a first filtration system, providing at least one pass, the first filtration system selected from the group consisting of reverse osmosis filtration, nanofiltration, ultrafiltration, and combinations thereof, each pass having a molecular weight cutoff to remove, from permeate, constituents within a range between about 100 and 30,000 grams per mole, the first filtration system having a starting liquid input, the first filtration system configured to produce, as a permeate, a liquid feed output feed, from the starting liquid input, having less than about 0.5% by weight of constituents selected from the group consisting of proteins, pectins, starches, sugars, and combinations thereof, and having about 3% to 25% by weight of ethanol;
a reverse osmosis separation system, having at least a first pass, wherein (i) each pass of the reverse osmosis separation system has at least one reverse osmosis membrane filtration unit, each membrane filtration unit having an ethanol rejection percentage of between about 50% to 99%, (ii) each pass has a feed stream inlet for a feed stream, a permeate stream outlet for a permeate stream, and a retentate stream outlet for a retentate stream, (iii) the feed stream inlet of the first pass is coupled to the liquid feed; (iv) a controller-operated pump coupled to the reverse osmosis separation system and configured to maintain pressure in at least one of the membrane filtration units in a range of about 1,200 to about 4,000 psi; and (v) the retentate stream outlet of a last pass of the reverse osmosis separation system differs from the starting liquid by absence of the removed constituents.

P30. A system according to claim P29, wherein the first filtration system is configured to produce, as the permeate, the liquid feed output feed, from the starting liquid input, having less than about 0.1% by weight of the constituents.

P31. A system according claim P29, wherein each pass has the molecular weight cutoff to remove, from the permeate, the constituents within a range between about 20 and 30,000 grams per mole.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for producing an ethanol solution from a starting liquid having an ethanol component, the method comprising:
   obtaining, from the starting liquid, a liquid feed having less than 0.5% by weight of constituents selected from the group consisting of proteins, pectins, starches, sugars, and combinations thereof, and having 3% to 25% by weight of ethanol, by deriving the liquid feed as a permeate resulting from at least one pass of a filtration process selected from the group consisting of reverse osmosis filtration, nanofiltration, ultrafiltration, and combinations thereof, each pass of the filtration process having a molecular weight cutoff to remove, from the permeate, constituents within a range between about 100 and 30,000 grams per mole;
   supplying the liquid feed to a feed stream inlet of a reverse osmosis separation system, the reverse osmosis separation system having at least a first pass, wherein (i) each pass of the reverse osmosis separation system has at least one reverse osmosis membrane filtration unit, each membrane filtration unit having an ethanol rejection percentage of between about 50% to 99%, and (ii) each pass has the feed stream inlet for a feed stream, a permeate stream outlet for a permeate stream, and a retentate stream outlet for a retentate stream; and
   operating the reverse osmosis separation system to maintain pressure in at least one of the membrane filtration units in a range of about 1,200 to about 4,000 psi;
   obtaining retentate, from the retentate stream outlet of the first pass of the reverse osmosis separation system, that is enriched with ethanol, wherein the retentate differs from the starting liquid by absence of the removed constituents; and using the retentate to make the ethanol solution without adding back any of the removed constituents.

2. A method according to claim 1, further comprising distilling the retentate from the retentate stream outlet of the first pass, so as to form an ethanol distillate.

3. A method according to claim 2, wherein the ethanol distillate is between about 80 and 195 proof ethanol.

4. A method according to claim 1, wherein processes of supplying the liquid feed to the feed stream inlet of the first pass of the reverse osmosis separation system and of obtaining the retentate are carried out while maintaining a temperature of liquid in the at least one reverse osmosis membrane filtration unit in a range between a freezing point of the liquid feed and 10° C.

5. A method according to claim 1, wherein deriving the liquid feed as the permeate resulting from the at least one pass includes operating the at least one pass at a temperature in a range between about 15 and 35° C.

6. A method according to claim 1, wherein deriving the liquid feed includes operating the first pass of the filtration process at a pressure in a range of about 100 psi to 1,200 psi.

7. A method according to claim 6, wherein the filtration process is selected from the group consisting of nanofiltration, ultrafiltration, and combinations thereof, and deriving the liquid feed includes operating the first pass of the filtration process in a range of about 200 psi to 800 psi.

8. A method according to claim 1, wherein the reverse osmosis separation system has at least first and second passes, and the feed stream of the second pass is coupled to the first pass permeate stream outlet, the method further comprising:
   recycling the retentate from the retentate stream outlet of the second pass to the feed stream inlet of the first pass.

9. A method according to claim 8, wherein the second pass of the reverse osmosis separation system yields a permeate having ethanol in a range of about 0.01% to 10% by weight.

10. A method according to claim 9, wherein the second pass of the reverse osmosis separation system yields a permeate having ethanol in a range of about 0.01% to 1% by weight.

11. A method according to claim 1, wherein supplying the liquid feed includes supplying the liquid feed to the feed stream inlet of the reverse osmosis separation system having a second pass, in which the permeate of the first pass is fed to the second pass and each pass yields a retentate, the method further comprising:
   combining the retentate of the first pass with the retentate of the second pass to yield a non-alcoholic beverage concentrate.

12. A method according to claim 11, further comprising combining the permeate stream of the reverse osmosis separation system with the non-alcoholic beverage concentrate to form a non-alcoholic beverage.

13. A method according to claim 1, wherein supplying the liquid feed includes supplying the liquid feed to the feed stream inlet of the reverse osmosis separation system having a second pass configured to operate at a pressure in a range of about 400 psi to 1,500 psi.

14. A method according to claim 13, wherein the second pass is configured to operate at a pressure in a range of about 800 psi to 1,200 psi.

15. A method according to claim 1, wherein the starting liquid is an alcoholic beverage.

16. A method according to claim 15, wherein the starting liquid includes ethanol in a range of about 1% to 40% by weight.

17. A method according to claim 16, wherein the starting liquid includes ethanol in a range of about 3% to 25% by weight.

18. A method according to claim 1, wherein the retentate from the first pass of the reverse osmosis separation system has an ethanol concentration in a range of about 10% to 60% by weight.

19. A method according to claim 18, wherein the retentate from the first pass of the reverse osmosis separation system has the ethanol concentration in a range of about 20% to 40% by weight.

* * * * *